United States Patent [19]
Willeitner

[11] 3,786,694
[45] Jan. 22, 1974

[54] DAMPING DEVICE FOR AN INHOMOGENEOUS CENTRIFUGE ROTOR

[75] Inventor: Eberhardt Willeitner, Munich, Germany

[73] Assignee: Maschinenfabrik Augsburg Nuernberg Aktiengesellschaft, Munich, Germany

[22] Filed: May 8, 1972

[21] Appl. No.: 250,913

[30] Foreign Application Priority Data
May 7, 1971  Germany.....................2122602

[52] U.S. Cl.......................... 74/573, 310/51, 310/66
[51] Int. Cl.............................................. F16f 15/22
[58] Field of Search.... 310/51, 43, 183, 66; 74/573, 74/574; 64/1 V

[56] References Cited
UNITED STATES PATENTS

| | | | |
|---|---|---|---|
| 3,336,818 | 8/1967 | Allen | 74/573 |
| 2,437,954 | 3/1948 | Havill | 64/1 V |
| 2,738,660 | 3/1956 | Gail | 64/1 V |
| 3,686,895 | 8/1972 | Easley | 64/1 V |
| 3,673,813 | 7/1972 | Wright | 64/1 V |
| 3,274,798 | 9/1966 | Wiggins | 64/1 V |

Primary Examiner—R. Skudy
Attorney, Agent, or Firm—Paul M. Craig, Jr. et al.

[57] ABSTRACT

A damping device for damping the deflections of an inhomogeneous centrifuge rotor which is elastically supported on both sides, in which the damping device is arranged along the rotor axis on the inside of the rotor and the deflections of the rotor are transmitted to the damping device with the use of a system of co-axial ring magnets by way of a disc and devoid of mechanical contact.

14 Claims, 1 Drawing Figure

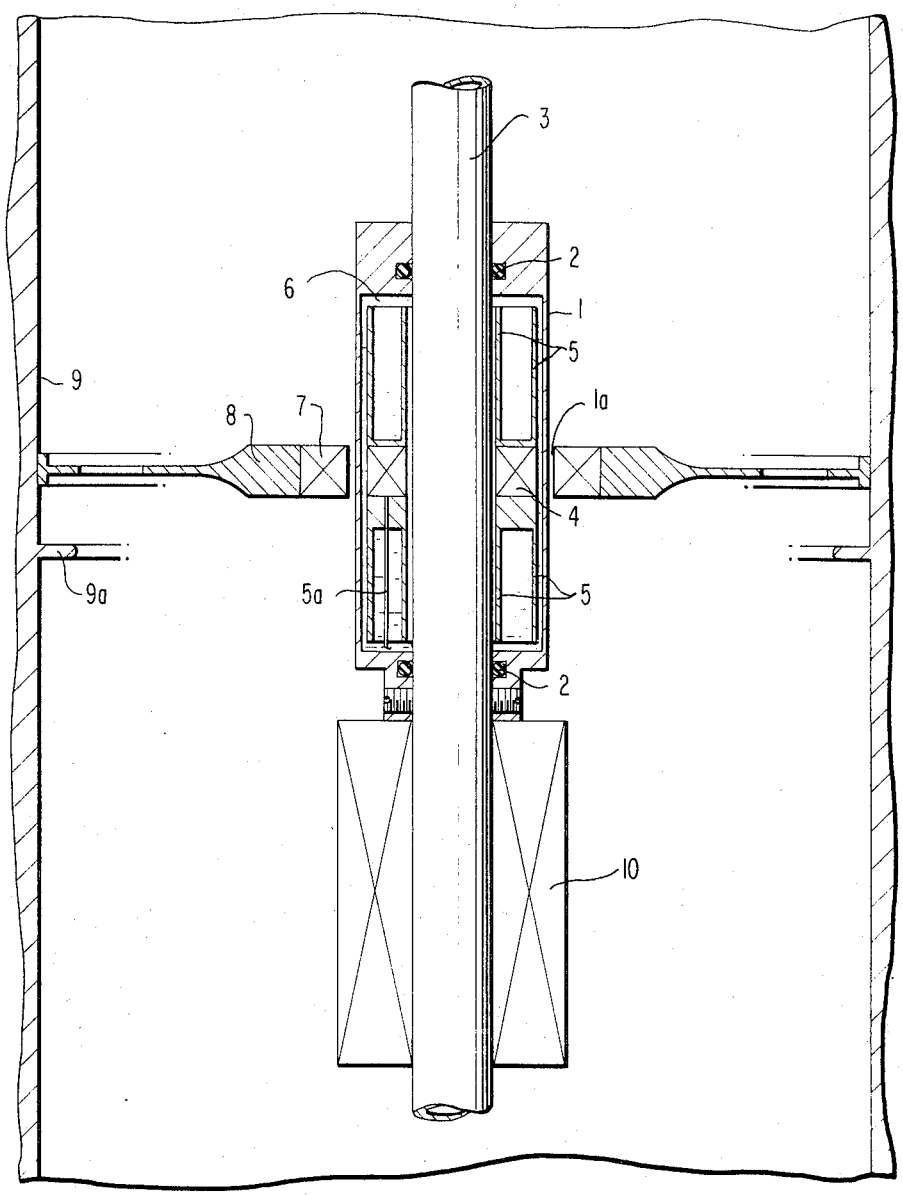

DAMPING DEVICE FOR AN INHOMOGENEOUS CENTRIFUGE ROTOR

The present invention relates to a device for damping an inhomogeneous centrifuge rotor having a flexible bearing at both ends.

Known in the prior art are centrifuge rotors which have at either end a flexible bearing and means for the hydraulic damping with oil. Such rotors are subject to precession movements imposed by interferences. There is a limit with respect to the magnitude of the amplitudes, which should remain at most within the range of a few tenths of a millimeter. The precession movements and the superposed interferences are essentially circular motions which are transmitted onto damping media.

In the case of inhomogeneous or multisection rotors, the action of the two damping bearings at the rotor ends is invariably less pronounced on the inner sections. The rotor sections which are connected with each other by flexible resilient members, such as bellows or corrugated elements, oscillate about these interconnected spring elements.

Since the damping actions cannot be augmented indefinitely, the present invention therefore is concerned with the task to provide a damping device for damping inhomogeneous rotors in centrifuges, by means of which also the interconnected rotor sections can be effectively damped to a tolerable degree of the deflections.

The underlying problems are solved according to the present invention in that the damping device is arranged on the inside of the rotor and along the rotor axis, onto which rotor deflections are adapted to be transmitted by way of a disc in the rotor and by means of a magnetic system without resort to mechanical contact.

The damping device of the present invention serves to transform interference-induced rotor precessions into a tolerable order of magnitude.

In a further aspect of the present invention, the damping device consists of a cylindrical oil-filled housing having an internally arranged ring magnet, in the faces of which are inserted readily yielding barrel-shaped damping elements, and the housing is surrounded without mechanical contact by a second ring magnet which is coplanar with the first and is set in the disc. To provide mutual repulsion between the two ring magnets, they must be of like polarity.

According to a further feature of the present invention, the housing is secured at a stationary, centrally guided tube in the rotor, which may be the feed or the extraction tube.

In a further aspect of the present invention, the damping device may be located at any desirable point along the rotor axis. For best results, however, its preferred location will be near the point of maximum rotor deflection.

In order to decrease the natural frequency of the housing and of the centrally guided tube in the rotor, and in order to minimize the amplitudes caused by rotor deflections, the present invention further proposes to utilize an additional mass near the housing. The inertia with respect to the rotor is increased by this measure.

These and further objects, features and advantages of the present invention will become more apparent from the following description when taken in conjunction with the accompanying drawing which shows, for purposes of illustration only, one embodiment in accordance with the present invention, and wherein:

The single FIGURE is a schematic cross-sectional view through a damping device in accordance with the present invention.

Referring now to the single FIGURE of the drawing which illustrates schematically one embodiment in accordance with the present invention, the damping device comprises a cylindrical housing 1 which is secured to a central tube 3, i.e., the feed tube 3. The interior of the housing 1 is sealed by means of seals 2, e.g., in the form of sealing rings. Arranged in the housing interior is a ring magnet 4 which at both end faces carries barrel-shaped damping elements 5. These damping elements 5 are readily movably supported in the housing by three thin wires 5a providing the required freedom of movement. The housing is additionally filled with a suitable oil 6, and it is surrounded with a second ring magnet 7 which is coplanar with the magnet 4. The polarity of the magnets 4 and 7 is thereby selected for repulsion between them. The ring magnet 7 is set into a disc 8 which in turn is attached to an inhomogeneous rotor 9 provided with a bellows 9a or the like. An annular gap 1a is formed between the ring magnet 7 and the housing 1 to permit radial deflection movements between the housing 1 and the rotating members 7, 8 and 9. Resting also on the central tube 3 is an additional mass 10 provided near the damping housing.

During rotation of the inhomogeneous rotor 9, its deflections are transmitted, by way of the disc 8, also onto the ring magnet 7 which, however, is repulsed by the ring magnet 4 disposed in the interior of the housing 1 due to the same polarity of the two magnets 4 and 7 facing each other. The ring magnet 4 is nonetheless able to carry out its deflections within an annular chamber on the inside of the housing 1 where oil is acting on the damping elements 5 inserted on its end faces to cushion these movements. The damping surfaces are formed, on the one hand, by the outer and inner surfaces or shrouds of the damping elements 5 and, on the other, by the inner wall of the housing 1 and the outer shroud or surface of the central tube 3. By reason of the polarity of the ring magnets 4 and 7, of which the former is hydraulically damped with oil, the deflections of the rotor 9 can be limited to a minimum. The damping elements 5 may, of course, also be replaced by other known damping means, such as eddy current or electromagnetic damping means.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A damping device for damping the deflections of an inhomogeneous centrifuge rotor elastically supported on both sides thereof, characterized in that the damping device is arranged inside the rotor substantially along the rotor axis, and means for magnetically transmitting the deflections of the rotor to said damping device by way of a disc in the rotor without mechanical contact.

2. A device according to claim 1, characterized in that the damping device comprises a cylindrical oil-filled housing having an internally arranged ring magnet and damping means inserted into the end faces of the ring magnet, and in that the housing is surrounded contact-free by a second ring magnet which is coplanar with the first-mentioned magnet and is held in the disc.

3. A damping device for damping the deflections of an inhomogeneous centrifuge rotor elastically supported on both sides thereof, characterized in that the damping device is arranged inside the rotor substantially along the rotor axis, and means for magnetically transmitting the deflections of the rotor to said damping device by way of a disc in the rotor without mechanical contact; characterized in that the damping device comprises a cylindrical oil-filled housing having an internally arranged ring magnet and damping means inserted into the end faces of the ring magnet, and in that the housing is surrounded contact-free by a second ring magnet which is coplanar with the first-mentioned magnet and is held in the disc; and characterized in that the ring magnets are of like polarity.

4. A damping device according to claim 3, characterized in that the housing is secured at a stationary tube centrally guided in the rotor.

5. A damping device according to claim 4, characterized in that said tube is at least one of a feed tube and an extraction tube.

6. A damping device according to claim 4, characterized in that the axial location of the housing in the rotor is within the area of maximum rotor deflection.

7. A damping device according to claim 6, characterized in that an additional mass is provided near the housing.

8. A device according to claim 7, characterized in that the damping means are readily yielding barrel-shaped damping elements.

9. A damping device according to claim 7, characterized in that the damping means provided for the hydraulic damping include one of an eddy current damping means and an electromagnetic damping means.

10. A damping device for damping the deflections of an inhomogeneous centrifuge rotor elastically supported on both sides thereof, characterized in that the damping device is arranged inside the rotor substantially along the rotor axis, and means for magnetically transmitting the deflections of the rotor to said damping device by way of a disc in the rotor without mechanical contact; characterized in that the damping device comprises a cylindrical oil-filled housing having an internally arranged ring magnet and camping means inserted into the end faces of the ring magnet, and in that the housing is surrounded contact-free by a second ring magnet which is coplanar with the first-mentioned magnet and is held in the disc; and characterized in that the housing is secured at a stationary tube centrally guided in the rotor.

11. A damping device for damping the deflections of an inhomogeneous centrifuge rotor elastically supported on both sides thereof, characterized in that the damping device is arranged inside the rotor substantially along the rotor axis, and means for magnetically transmitting the deflections of the rotor to said amping device by way of a disc in the rotor without mechanical contact; characterized in that the damping device comprises a cylindrical oil-filled housing having an internally arranged ring magnet and damping means inserted into the end faces of the ring magnet, and in that the housing is surrounded contact-free by a second ring magnet which is coplanar with the first-mentioned magnet and is held in the disc; and characterized in that the axial location of the housing in the rotor is within the area of maximum rotor deflection.

12. A damping device for damping the deflections of an inhomogeneous centrifuge rotor elastically supported on both sides thereof, characterized in that the damping device is arranged inside the rotor substantially along the rotor axis, and means for magnetically transmitting the deflections of the rotor to said damping device by way of a disc in the rotor without mechanical contact; characterized in that the damping device comprises a cylindrical oil-filled housing having an internally arranged ring magnet and damping means inserted into the end faces of the ring magnet, and in that the housing is surrounded contact-free by a second ring magnet which is coplanar with the first-mentioned magnet and is held in the disc; and characterized in that an additional mass is provided near the housing.

13. A device according to claim 2, characterized in that the damping means are readily yielding barrel-shaped damping elements.

14. A damping device according to claim 2, characterized in that the damping means provided for the hydraulic damping include one of eddy current damping means and an electromagnetic damping means.

* * * * *